United States Patent [19]

Nakamura et al.

[11] Patent Number: 4,587,179
[45] Date of Patent: May 6, 1986

[54] MAGNETIC RECORDING MEDIUM AND MANUFACTURING PROCESS THEREOF

[75] Inventors: Kyuzo Nakamura; Yoshifumi Ota, both of Yachimata, Japan

[73] Assignee: Nihon Shinku Gijutsu Kabushiki Kaisha, Kanagawa, Japan

[21] Appl. No.: 549,518

[22] Filed: Nov. 7, 1983

[30] Foreign Application Priority Data

Nov. 9, 1982 [JP] Japan ................... 57-195234

[51] Int. Cl.⁴ .............................................. G11B 5/64
[52] U.S. Cl. ................... 428/694; 360/134; 360/135; 360/136; 427/128; 427/132; 204/192 M; 428/900
[58] Field of Search ............ 427/132, 128; 428/694, 428/900, 695; 360/134–136; 204/192 M

[56] References Cited

U.S. PATENT DOCUMENTS

| | | | |
|---|---|---|---|
| 3,342,632 | 9/1967 | Bate | 427/132 |
| 3,342,633 | 9/1967 | Bate | 427/132 |
| 3,414,430 | 12/1968 | Maho | 427/132 |
| 4,260,466 | 4/1981 | Shirahata | 427/44 |

FOREIGN PATENT DOCUMENTS 2731924  7/1977  Fed. Rep. of Germany .

Primary Examiner—Ellis P. Robinson
Attorney, Agent, or Firm—Armstrong, Nikaido, Marmelstein & Kubovcik

[57] ABSTRACT

A magnetic recording member characterized in that a magnetic film formed on a surface of a substrate has a very small amount of hydrogen mixed therein. The manufacturing process therefor is characterized in that hydrogen gas is introduced into the vacuum treatment chamber while the magnetic particles are adhered to the surface of the substrate.

5 Claims, 4 Drawing Figures

MAGNETIC RECORDING MEDIUM AND MANUFACTURING PROCESS THEREOF

DETAILED EXPLANATION OF INVENTION

This invention relates to a magnetic recording member and a process for manufacturing thereof.

In recent years, a requirement for obtaining a magnetic recording member having a high coercive force has been rising in the field of VTR, PCM recording or the like. For satisfying this requirement, there has been hitherto proposed a manufacturing process wherein a simple element of a magnetic metal as Co, Ni, Fe or the like or an alloy thereof is used as raw material. Vapor particles thereof are deposited at an oblique incident angle on a surface of a substrate of such a non-magnetic material as a synthetic resin or the like, by a physical vapor deposition process such as vapor deposition process, ion plating process, sputtering process or the like to manufacture a magnetic recording member of high density having a high coercive force. Some of the products obtained by this type of manufacturing have been put into practical use.

In this type of manufacturing, however, for obtaining a magnetic recording member having a desired high coercive force, it is necessary to deposit only vapor flow having a comparatively large minimum incident angle. This has the disadvantage in that this causes the adhesion rate of vapor particles to the substrate surface to become extremely low. Therefore, it has been usual with this type of manufacturing to carry out an oblique incident deposition of vapors particles on such a side that the minimum incident angle is comparatively small. However, for producing, for instance, an audio tape of 550–600 Oe in Hc and a video tape of 900–1000 Oe in Hc whose values are suitable for practical use, by a conventional vacuum vapor deposition apparatus, the minimum incident angle must be above about 40 degrees and above about 50 degrees, respectively. If the minimum incident angle is about below these values and is, for instance, about 20 degrees, the product is lowered to about 350 Oe in its coercive force Hc which is unsuitable for practical use. For manufacturing a magnetic film having a high coercive force suitable for practical use even by using such a small minimum incident angle as above, it has been tried to form a film in an atmosphere containing oxygen gas introduced into the vacuum vapor deposition apparatus. However, it has been learned that the formed film is poor in corrosion resistance and the saturation magnetization of the film drops by 20–30% after the lapse of one week to ten days after the manufacturing compared with the saturation magnetization immediately after it is made.

OBJECTS AND SUMMARY OF THE INVENTION

This invention has for its object to provide a magnetic recording member free from the foregoing defects, suitable for practical use and improved in corrosion resistance. Another object is to provide a manufacturing process which makes it possible to produce the foreoing magnetic member by using even such a minimum incident angle that has been hitherto unsuitable for practical use.

This invention is a magnetic recording member characterized in that a magnetic film formed on a surface of a substrate has 0.2–7 at. % of hydrogen mixed therein.

Additionally, this invention is a manufacturing process characterized in that, when magnetic particles are intended to be adhered to a surface of a substrate to form a magnetic film thereof in a vacuum treatment chamber, hydrogen gas is introduced into the treatment chamber at a partial pressure of $1 \times 10^{-4}$ to $10^{-2}$ Torr and the adhesion of the magnetic particles is carried out in a hydrogen gas atmosphere, so that there is formed a magnetic film thereof having 0.2–7 at % of hydrogen atom mixed therein.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

Figure 1:
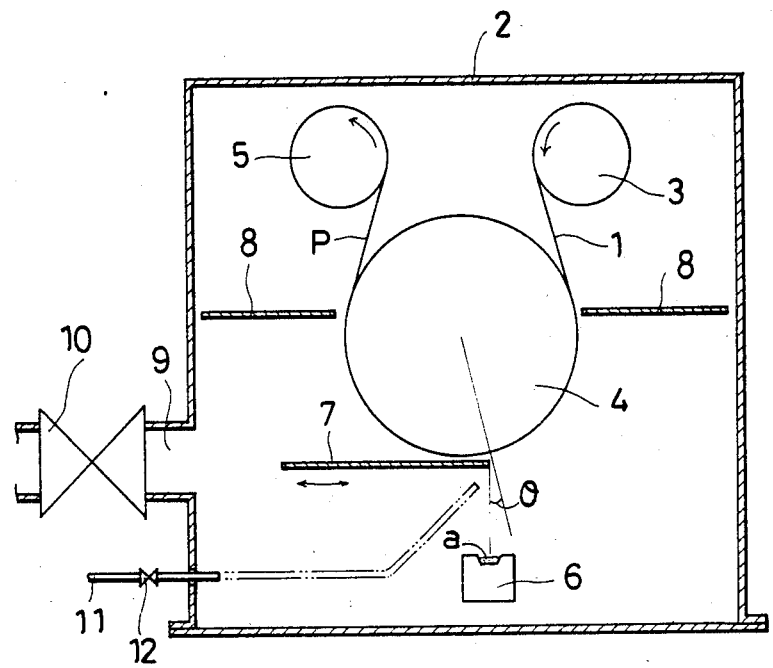
FIG. 1 is a side view, partly in section, of one example of an apparatus for carrying out this invention.

Next, embodying examples of this invention will now be explained with reference to the accompanying drawings:

FIG. 1 shown one example of a vacuum vapor deposition apparatus for carrying out a manufacturing process of a magnetic recording member of this invention.

A tape-shaped substrate 1 made of a polyester film is mounted on an unwinding roller 3 provided on one side of an upper portion of the interior of a vaccum treatment chamber 2, and is arranged to run at a constant speed around a circumferential surface of a water-cooled can 4 of cylindrical drum type to be taken up by a winding roller 5 provided on the other side thereof. An electron beam type heating evaporation source container 6 containing, at its upward open hollow surface, a suitable magnetic material a is provided below the water-cooled can 4. A movable vapor-adhesion prevention plate 7 extending horizontally is provided near the lower surface of the water-cooled can 4 and is movable forwards and backwards as shown by an arrow. The front end of the vapor-adhesion prevention plate 7 controls the minimum oblique incident angle $\theta$ at which vapors, that is, magnetic particles evaporated from the evaporation source container 6 towards a surface of the substrate 1 are deposited on the lowermost end surface of the water-cooled can 4. A stationary vapor-adhesion prevention plate 8 is provided on each of both sides of the watercooled can 4. The plates 8 serve to prevent the roller 3, 5 or the surrounding portions from being spoiled with vapors from the evaporation container 6. A suction evacuation opening 9 is connected through an opening and closing control valve 10 to a vacuum pump (not illustrated).

According to this invention, a hydrogen gas introducing pipe 11 is inserted into the treatment chamber 2 to open in the interior thereof so that there is created in the vacuum treatment chamber 2 an atmosphere of proper hydrogen gas partial pressure by introducing hydrogen into the chamber 2 through the pipe 11 while evacuating the chamber through the evacuation opening 9. The hydrogen gas introducing pipe 11 is provided having an open end simply opened in the interior of the treatment chamber 2 as shown by solid lines, or having the open end extended so that it is located near the surface of the substrate 1 as shown by dot-dashlines. A control valve 12 is interposed in the hydrogen gas introducing pipe 11.

A magnetic recording member of this invention is manufactured by the foregoing apparatus, for instance as follows:

After the interior of the vacuum treatment chamber 2 is evacuated to be $1 \times 10^{-5}$ Torr, hydrogen gas is introduced into the treatment chamber 2 through the hydrogen gas introducing pipe 11 shown by solid lines and the partial pressure thereof is kept to be $10^{-3}$ Torr. The movable vapor-adhesion prevention plate 7 is previously set so that the minimum incident angle of the evaporated vapors of the evaporation material in relation to the surface of the running tape substrate 1 to be treated may be a constant value of 55 degrees. A Co-30% Ni alloy, for instance, is evaporated by electron beam heating from the evaporation source container 6. The vapors thereof are deposited on the surface of the running tape 1 at the foregoing minimum incident angle. In this case, the running speed of the tape substrate 1 sent out from the unwinding roller 3 is adjusted so that there may be formed thereon a coating film having a constant thickness of 1500 Å. Thus, hydrogen gas is brought into contact with the evaporated particles of the magnetic material, and a magnetic film thereof in which microquantities of hydrogen atoms are mixed therein is formed on the surface of the substrate 1, and this invention magnetic tape P is obtained on the winding roller 5.

Figure 2:
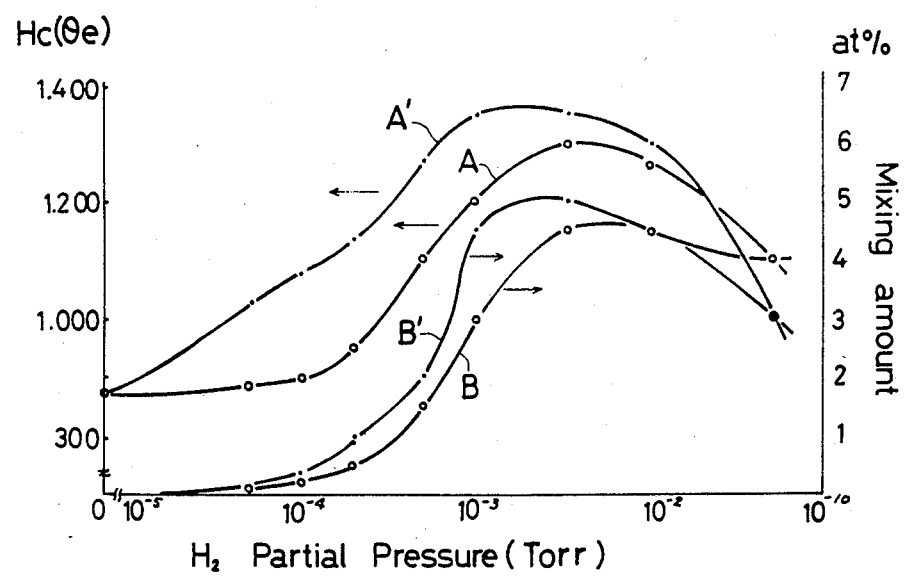
FIG. 2 is a diagram showing relationship of hydrogen partial pressure with a magnetic holding force and a hydrogen mixing amount in a magnetic film.

In this manufacturing process, tests have been made in respect of a change of the coercive force Hc of the magnetic tape manufactured on a change of the mixing amount (at.%) of the hydrogen atoms in the magnetic film thereof, under the condition that the incident angle is kept to be a constant value of 55 degrees, while the hydrogen partial pressure is varied within a range of from $10^{-3}$ Torr to $10^{-1}$-$10^{-5}$ Torr, to obtain the results as shown in FIG. 2. As will be clear from a force characteristic curve A thereof, the force Hc thereof is improved by the introduction of the hydrogen gas, in comparison with the case in which hydrogen gas is not introduced, and the maximum value thereof is obtained especially within a range of $10^{-3}$-$10^{-2}$ Torr. The hydrogen atom mixing amount in the magnetic film is analyzed by a SIMS means, and the relation of a mixing amount of characteristic curve B thereof with the hydrogen partial pressure and with the coercive force is studied and the following results are obtained. Namely, it has been found that the mixing amount is increased according as the hydrogen partial pressure is increased, and the coercive force is increased with the sharp increase in the mixing amount as long as the hydrogen partial pressure is $10^{-4}$-$10^{-2}$ Torr. At a $10^{-4}$ Torr level an increasing effect of the coercive force is large even with a mixing amount of hydrogen atom as very small as below 1 at.%. The maximum mixing amount of 5 at.% can be obtained in a range of $10^{-3}$-$10^{-2}$ Torr. The coercive force of this maximum value is about 1300 Oe and is extremely improved from the coercive force of 900 Oe of the case that the hydrogen gas is not introduced. But even when the hydrogen partial pressure is increased from $10^{-2}$ Torr to $10^{-1}$ Torr, a tendency is shown wherein the mixing amount of hydrogen atom and the coercive force are not increased but rather decreased.

Cross-sections of these magnetic films have been observed by a transmission type electron microscope and it has been found that accumulated particles in the form of a pillar formed on the substrate surface are finer ones. Direct contact between those particles become less. By observation with the naked eye, it has been found that blackness of the magnetic films is increased. This increased blackness supports the foregoing fact that the deposited particles are finer in size than those in the conventional process. As a result of various studies, it has been learned that, where the hydrogen partial pressure is above $10^{-2}$ Torr, the magnetic vapors are scattered before being deposited on the substrate surface, by hydrogen gas molecules, so that a predetermined oblique incident effect is decreased. Consequently, the coercive force thereof tends to be decreased. Additionally, it has been learned that where it is above $10^{-1}$ Torr, the deposited particles become an aggregate of superfine powders and thereby the magnetic film is decreased in its mechanical strength. It can be concluded from the above facts that the hydrogen partial pressure is preferably within the range of $10^{-4}$-$10^{-2}$ Torr, and that the improvement in the coercive force can be achieved by that the mixing amount of 0.2-5 at.% of the hydrogen atom in the magnetic film.

If the open end of the hydrogen gas introducing pipe 11 is positioned near the surface of the tape substrate 1 as shown by the dot-dash lines and the hydrogen gas is discharged therefrom towards that surface so that the vapor deposition may be carried out under the condition that in the vicinity of the surface to be deposited, there is created a comparatively rich concentration of hydrogen gas (but the surrounding hydrogen atmosphere of that gas in the treatment chamber 2 is kept within the range of $10^{-4}$-$10^{-1}$ in hydrogen partial pressure), there have been obtained a coercive force characteristic curve A' and a hydrogen atom mixing amount characteristic curve B' as shown in FIG. 2. It has been found in this case that, in comparison with the foregoing simple hydrogen introducing case, the coercive force is further remarkably improved within the range of the hydrogen partial pressure of $10^{-4}$-$10^{-2}$ as a whole. The maximum coercive force is increased to as much as 1400 Oe and the maximum mixing amount of the hydrogen atom is about 5 at.% in the range of $10^{-3}$-$10^{-2}$ Torr.

Figure 3:
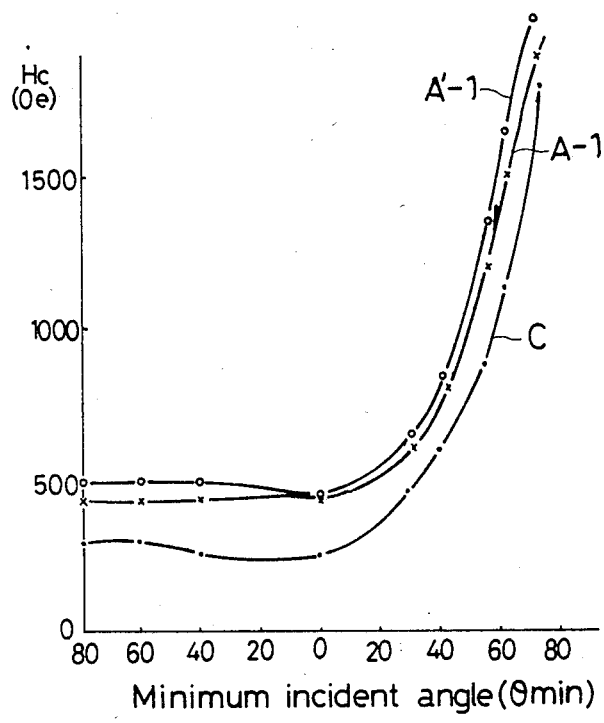
FIG. 3 is a comparison diagram showing an influence of hydrogen introduction on an incident angle and a magnetic holding force.

Next, in respect of the influence of the introduction or hydrogen gas on the minimum incident angle and the coercive force, tests have been made under the condition that the hydrogen partial pressure is kept constant, for instance, at $1 \times 10^{-3}$ Torr. The results thereof are as shown in FIG. 3. In this Figure, A-1 is a coercive force characteristic curve in such a case that the hydrogen gas introducing pipe is open near the substrate surface. C is a force characteristic curve in the case of a conventional process wherein hydrogen gas is not introduced. The evaporated metal is Co-30% Ni, and the film thickness is a constant value of 1500 Å. As is clear from this Figure, when hydrogen gas is introduced, the coercive force is improved at any of various minimum incident angles as compared with that obtained by the conventional process. The best improvement is made by the process that the hydrogen gas introducing pipe is opened near the substrate surface. Especially, a product which is suitable for practical use can be obtained at the minimum incident angle at which a product suitable for practical use cannot be obtained by the conventional process. Namely, by the conventional process, the coercive force is below 400 Oe if the minimum incident angle is below 20 degrees. Thus, an audio tape suitable for practical use cannot be obtained, but a product which has an improved coercive force of 500-550 Oe, that is suitable for practical use can be obtained by this invention process. When viewed from such a standpoint that the vapor-adhesion rate can be increased according as the minimum incident angle is made smaller, for obtaining products having the same coercive force of 900 Oe, for instance, the minimum incident angle is required to be above near 55 degrees in the conventional process, but the same can be decreased to near 40 degrees in this invention process. In this manner, the product can be obtained by the adhesion rate improved by that degree and this results in such an advantage that an economical production can be carried out. In the case of the hydrogen introduction of this invention process, even if the minimum incident angle is brought to be below 0 degree and the vapor deposition is effected nearly vertically or at any incident angle in the opposite direction as shown in FIG. 3, there can be obtained a product which has the coercive force as high as 500 Oe.

In the foregoing embodying example, this invention has been applied to the case of vapor deposition treatment by the electron beam heating, but this invention can be applied also to any desired magnetic film forming process such as an ion plating one, a sputtering one or any other desired film forming process and thereby desired results can be obtained. As for the magnetic material, the Co - 30% Ni alloy has been used in the foregoing example. Almost the same experiments have been carried out in respect of Co, Ni, Fe and it has been learned that almost the same increase in coercive force in respect of all of the same can be obtained. As for the substrate, in addition to the tape, a hard substrate or the like of synthetic resin, inorganic material and others can be selectively used in accordance with the purpose of use therof.

Figure 4:
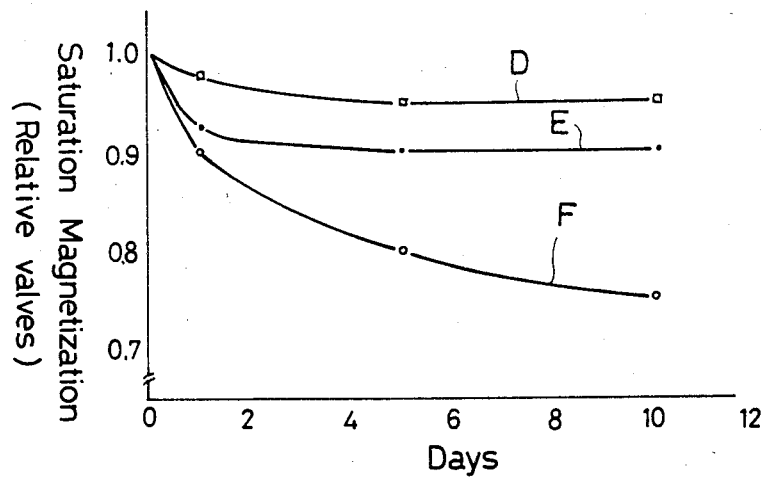
FIG. 4 is a comparison diagram of corrosion resistance.

A corrosion resistance test has been made in respect of this invention magnetic recording member manufactured as above. Namely, a decrease in the saturation magnetization thereof has been measured when the product is allowed to stand in the atmosphere of humidity 90% and a temperature of 60° C. The results thereof are as shown in FIG. 4. In this Figure, it is represented by relative values in which the value of saturation magnetization just after manufacturing of the product is represented as 1. Referring to FIG. 4, D is a saturation magnetization characteristic curve of this invention. magnetic tape, E is the same characteristic curve of a conventional magnetic tape manufactured without introducing any gas, and F is the same characteristic curve of a conventional magnetic tape manufactured with oxygen gas being introduced. As will be clear therefrom, this invention magnetic tape is most excellent also in respect of corrosion resistance.

Good magnetic tapes of this invention can be obtained even if the substrate surface is at a room temperature or is properly heated to, for instance, 60° C. Additionally, it has been found that even when the product is heated to, for instance, 60° C., any hydrogen gas is not given off therefrom, and the magnetic property thereof is not changed at all. Thus the magnetic recording member is stable to heat.

Thus, according to this invention, hydrogen gas is introduced into the treatment chamber and under an atmosphere thereof a magnetic film is formed on a surface of a substrate, so that, in comparison with such a case that a magnetic film is formed without introducing any gas, there can be obtained a magnetic recording member which is improved in coercive force. A magnetic recording member which has an improved coercive force can be obtained even if an incident angle is made extremely small. Accordingly, the adhesion rate of the evaporated material can be also increased. Additionally, a product of which the coercive force is as high as that of a product obtained by the conventional oblique incident vapor deposition. The product is much more excellent in corrosion resistance than that obtained by the oxygen gas introducing process.

It is readily apparent that the above-described magnetic recording medium and manufacturing process thereof meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A magnetic recording member characterized in that a magnetic film formed on a surface of a substrate has a very small amount of hydrogen mixed therein, the mixing amount of hydrogen atom being about 0.2-7 at.%.

2. A manufacturing process of a magnetic recording member characterized in that, when magnetic particles are to be adhered to a surface of a substrate in order to form a magnetic film thereof in a vacuum treatment chamber, hydrogen gas having a partial pressure within a range of $1 \times 10^{-4}$ to $10^{-2}$ Torr is introduced into the treatment chamber and the adhesion of the magnetic particles is carried out in a hydrogen gas atmosphere, so that there is formed a magnetic film thereof having 0.2-7 at.% of hydrogen mixed therein.

3. The manufacturing process of claim 2, wherein the introduction of the hydrogen gas is carried out by arranging a hydrogen gas introducing pipe to be open near a surface portion of the substrate that is to be subjected to the vapor deposition of magnetic vapor particles.

4. The manufacturing process of claim 2 wherein the temperature of the substrate is from room temperature to 60° C.

5. The manufacturing process of claim 3, wherein the vapor deposition is an oblique incident one.

* * * * *